June 2, 1953     L. S. WAIT     2,640,745
PISTON SEAL
Filed Aug. 7, 1950

INVENTOR.
LOUIS S. WAIT
BY
*William R. Lane*
ATTORNEY

Patented June 2, 1953

2,640,745

UNITED STATES PATENT OFFICE 2,640,745

PISTON SEAL

Louis S. Wait, Beverly Hills, Calif., assignor to North American Aviation, Inc.

Application August 7, 1950, Serial No. 178,125

2 Claims. (Cl. 309—23)

This invention relates to a seal, and particularly to a sealing arrangement for use with a propeller pitch-changing mechanism having a reciprocal piston.

Prior to this invention packings in the instant arrangement have deteriorated because, in addition to being constantly immersed in oil, they also form, at least in part, a bearing for the piston upon which they are mounted.

The invention is particularly usable with a pitch-changing mechanism utilizing a reciprocating piston which moves in one direction in response to oil pressure and in the opposite direction upon relief of oil pressure.

Accordingly, it is an object of this invention to provide a packing arrangement which forms a combined bearing and seal.

It is a further object of this invention to provide a combined bearing and seal in which the bearing is immersed in oil at all times and the oil pressure assists in fixing the sealing member into sealing position.

Figure 1:
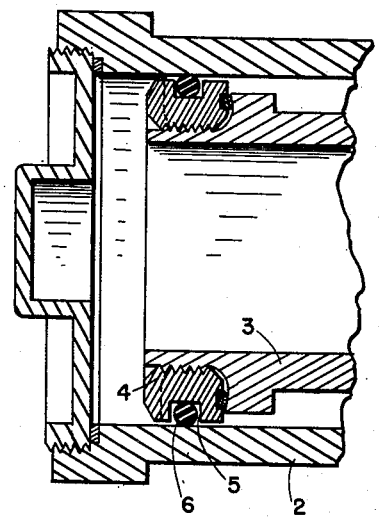
Figure 2:
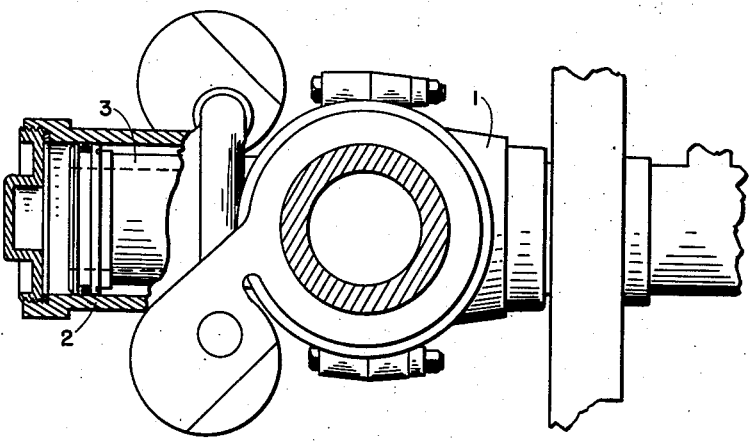
Figure 3:
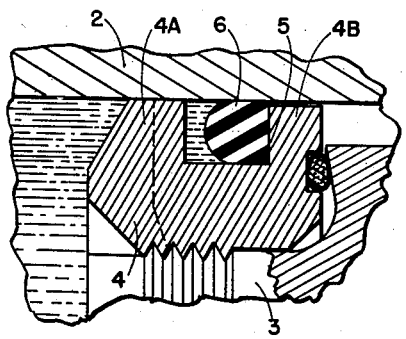

Other objects of invention will become apparent from the following description taken in connection with the accompanying drawings, in which Fig. 1 is a sectional view through the piston, cylinder, and the seal forming a part of the pitch-changing mechanism;

Fig. 2 is an elevational view of the pitch-changing mechanism with the piston and cylinder partly in section; and Fig. 3 is an enlarged view of a modified form of the adapter for carrying the seal.

Referring to the drawings, there is shown a housing 1 for carrying the propeller (not shown) and the pitch-changing mechanism. This pitch-changing mechanism is of a design which includes a cylinder 2 and a piston 3 which is hollow for supplying fluid under pressure to the left-hand side of the piston, as shown in Figs. 1 and 2. This arrangement is such that oil pressure moves the piston to the right, as viewed in Fig. 1, whereas relief of pressure results in the piston moving to the left.

In the past, the cylinder 3 has been provided with a packing flange which served both as a seal and as a partial bearing. The present invention comprises a piston 3 having an adapter 4 screw-threaded thereto or otherwise secured in any suitable manner to the end thereof. This adapter is provided with a U-shaped channel 5, defined by rims 4A and 4B, which carries an O-ring sealing element 6. This O-ring is of slightly greater diameter than the space between the bottom of channel 5 and the inside of cylinder wall 2. The fluid inside piston 3 which applies against the base of adapter 4 serves to force O-ring 6 into sealing engagement with the adapter and the inside wall of the cylinder 2.

In the instant arrangement clearance between the adapter 4 and the inside of cylinder wall 2 is from .005″–.015″. By this arrangement the adapter 4 also constitutes a bearing in the event piston 3 has any tendency to be misaligned with respect to cylinder 2. Since oil is applied to only one side of the O-ring, the "dry" side of the adapter 4 may have a greater clearance so as to avoid being in bearing engagement. This clearance may be an additional 3/64″ with the result that the rim 4B in Fig. 3 is 3/32″ less in diameter than the rim 4A. Such an arrangement enables the bearing parts to be immersed in oil whereas the non-bearing parts have sufficient clearance so as not to come in contact with the cylinder wall.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Sealing means for a piston reciprocally mounted in a cylinder and adapted to be moved in one direction in response to fluid pressure and in the other direction upon release of such pressure, said sealing means comprising an adapter on said piston, said adapter having a front and a back rim defining a U-shaped channel, an O-ring disposed in said channel and compressed between said adapter and cylinder, whereby fluid pressure exerted on said front rim will lubricate said front rim with respect to said cylinder and force said O-ring into sealing engagement with said back rim and said cylinder, the clearance between the front rim and said cylinder being approximately .005″ thereby to provide a bearing surface for engagement with said cylinder, said back rim having a clearance greater with respect to said cylinder than said front rim so as not to be brought into bearing engagement with said cylinder.

2. Sealing means for a piston reciprocable within a cylinder comprising; an adapter attached to the front end of said piston, said adapter having a front rim and a back rim defining a U-shaped channel, said front rim being in bearing engagement with said cylinder and said back rim being spaced therefrom; an O-ring disposed in said channel and compressed between said adapter and said cylinder, whereby fluid pressure against said front end of the piston will lubricate said front rim with respect to said cylinder and said fluid will force said O-ring into sealing engagement with said back rim thereby substantially precluding flow of fluid past said adapter.

LOUIS S. WAIT.

References Cited in the file of this patent

UNITED STATES PATENTS

| Number | Name | Date |
|---|---|---|
| 1,437,869 | Sullivan | Dec. 5, 1922 |
| 2,149,388 | Caldwell | Mar. 7, 1939 |
| 2,180,795 | Christensen | Nov. 21, 1939 |
| 2,314,683 | Berry | Mar. 23, 1943 |
| 2,332,786 | Fairhurst et al. | Oct. 26, 1943 |
| 2,437,586 | Aber | Mar. 9, 1948 |
| 2,447,340 | Jackson | Aug. 17, 1948 |
| 2,527,022 | May et al. | Oct. 24, 1950 |

FOREIGN PATENTS

| Number | Country | Date |
|---|---|---|
| 522,897 | Great Britain | July 1, 1940 |